US012659971B2

(12) United States Patent
Lee et al.

(10) Patent No.: US 12,659,971 B2
(45) Date of Patent: Jun. 16, 2026

(54) METHOD AND APPARATUS FOR PERFORMING MIXED MODE RETRANSMISSION IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 529 days.

(21) Appl. No.: 17/996,772

(22) PCT Filed: Apr. 20, 2021

(86) PCT No.: PCT/KR2021/004938
§ 371 (c)(1),
(2) Date: Oct. 20, 2022

(87) PCT Pub. No.: WO2021/215788
PCT Pub. Date: Oct. 28, 2021

(65) Prior Publication Data
US 2023/0171789 A1    Jun. 1, 2023

Related U.S. Application Data

(60) Provisional application No. 63/027,316, filed on May 19, 2020, provisional application No. 63/012,890, filed on Apr. 20, 2020.

(51) Int. Cl.
*H04W 72/25* (2023.01)
*H04L 1/1812* (2023.01)
*H04L 1/1867* (2023.01)

(52) U.S. Cl.
CPC ........... *H04W 72/25* (2023.01); *H04L 1/1812* (2013.01); *H04L 1/1887* (2013.01)

(58) Field of Classification Search
CPC .... H04L 1/1812; H04L 1/1887; H04W 72/20; H04W 72/25
See application file for complete search history.

(56) References Cited

U.S. PATENT DOCUMENTS 8,468,413 B2      6/2013  Kim et al.
2007/0300120 A1*   12/2007  Kim ...................... H04L 1/1851
                                                       714/749

(Continued)

FOREIGN PATENT DOCUMENTS

WO      WO-2011005521 A2 *   1/2011   ........... H04L 1/1825
WO      WO-2022151268 A1 *   7/2022

OTHER PUBLICATIONS

PCT International Application No. PCT/KR2021/004938, International Search Report dated Jul. 16, 2021, 5 pages.

(Continued)

*Primary Examiner* — Kevin C. Harper
(74) *Attorney, Agent, or Firm* — LEE, HONG, DEGERMAN, KANG & WAIMEY

(57)                    ABSTRACT

An operating method of a first device (100) in a wireless communication system is proposed. The method may comprise the steps of: transmitting sidelink control information (SCI) to a second device (200) through a physical sidelink control channel (PSCCH); performing initial transmission of a medium access control (MAC) protocol data unit (PDU) to the second device (200) through a physical sidelink shared channel (PSSCH) on the basis of the SCI; and performing N blind retransmissions and M HARQ-based retransmissions for the MAC PDU within a packet delay budget (PDB), on the basis of the initial transmission and the number of hybrid automatic repeat request (HARQ)-based retransmissions being less than the number of transmissions related to the PSSCH required within the PDB.

16 Claims, 20 Drawing Sheets

(56) References Cited

U.S. PATENT DOCUMENTS

| 2022/0224457 | A1* | 7/2022 | Ebrahim Rezagah | ........................ H04L 5/0055 |
| 2023/0198673 | A1* | 6/2023 | Hahn | .................... H04W 72/25 370/329 |
| 2023/0239902 | A1* | 7/2023 | Wu | ..................... H04W 74/002 370/329 |
| 2023/0247630 | A1* | 8/2023 | Yao | ........................ H04L 1/0038 370/329 |
| 2023/0269028 | A1* | 8/2023 | Kang | .................... H04L 1/1812 370/329 |

OTHER PUBLICATIONS

Lenovo et al., "Remaining aspects of NR V2X Tx UE behavior," R2-2001078, 3GPP TSG RAN WG2 Meeting #e109, Feb. 2020, 6 pages.
Lenovo et al., "Blind HARQ retransmissions," R2-2001073, 3GPP TSG RAN WG2 Meeting #e109, Feb. 2020, 4 pages.
Qualcomm Incorporated, "Sidelink Resource Allocation Mode 1," R1-2002538, 3GPP TSG RAN WG1 Meeting #100bis-e, Apr. 2020, 6 pages.
Lenovo et al., "Remaining aspects of SL HARQ protocol operation," R2-2000823, 3GPP TSG RAN WG2 Meeting #109e, Mar. 2020, 6 pages.

* cited by examiner

FIG. 3

BS(e.g. eNB or gNB)

Figure 18:
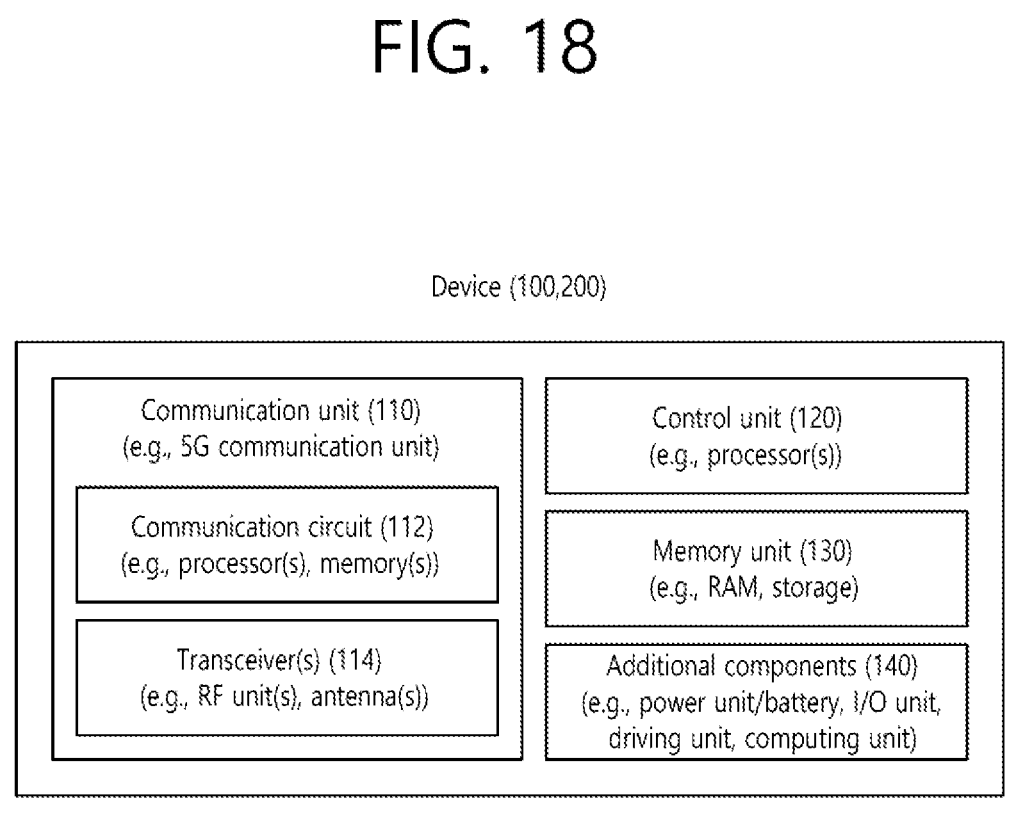

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 20

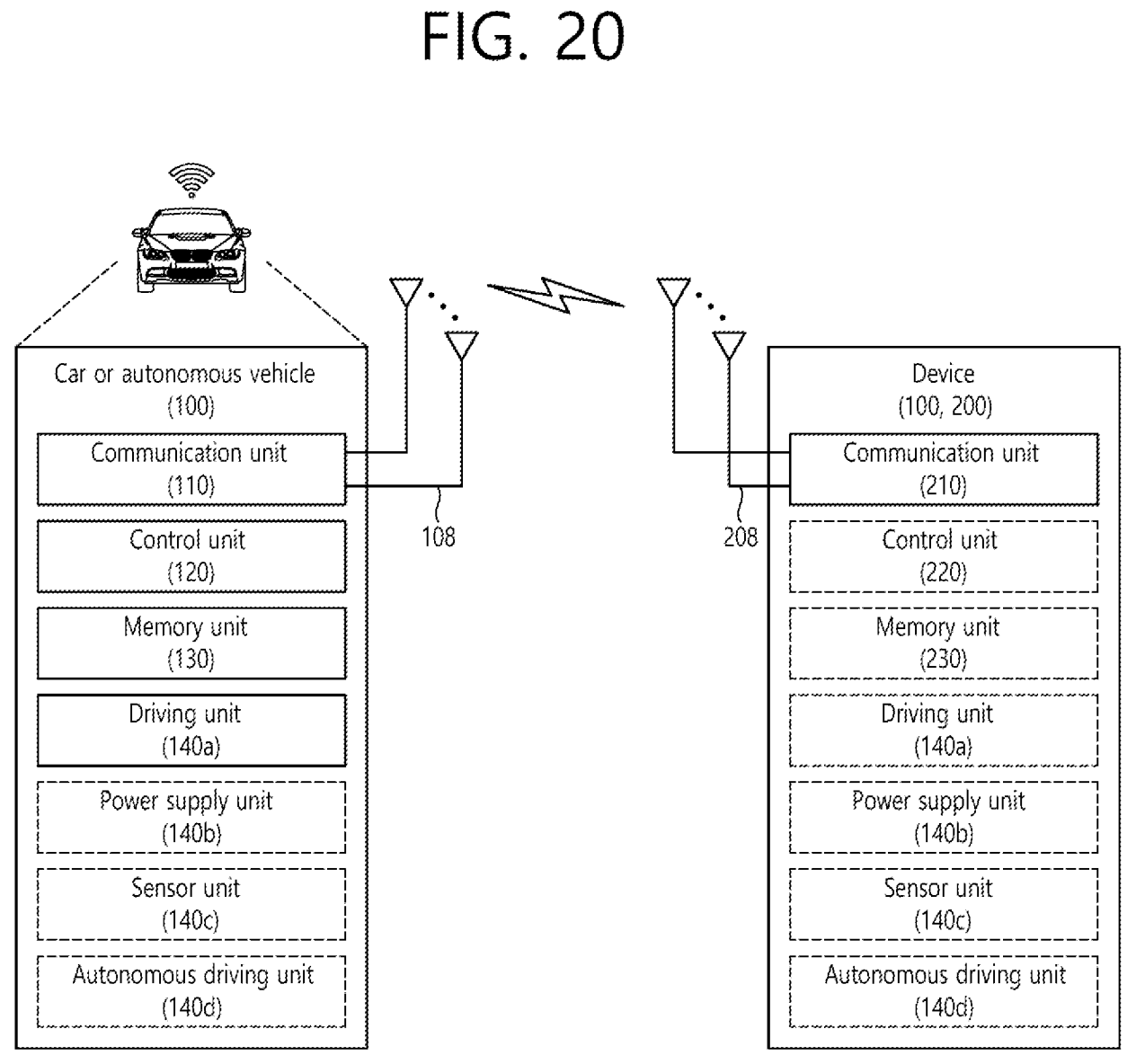

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD AND APPARATUS FOR PERFORMING MIXED MODE RETRANSMISSION IN NR V2X

CROSS-REFERENCE TO RELATED APPLICATION(S)

This application is the National Stage filing under 35 U.S.C. 371 of International Application No. PCT/KR2021/004938, filed on Apr. 20, 2021, which claims the benefit of U.S. Provisional Application No. 63/012,890, filed on Apr. 20, 2020, and 63/027,316, filed on May 19, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY

According to an embodiment, a method of operating the first device 100 in a wireless communication system is proposed. transmitting sidelink control information (SCI), to a second device, through a physical sidelink control channel (PSCCH); performing an initial transmission of a medium access control (MAC) protocol data unit (PDU), to the second device, through a physical sidelink shared channel (PSSCH) based on the SCI; and performing N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB.

The user equipment (UE) can efficiently perform SL communication.

BRIEF DESCRIPTION OF THE DRAWINGS

FIG. 3 shows a radio protocol architecture, based on an embodiment of the present disclosure.

FIG. 18 shows another example of a wireless device, based on an embodiment of the present disclosure.

FIG. 20 shows a vehicle or an autonomous vehicle, based on an embodiment of the present disclosure.

DETAILED DESCRIPTION

Figure 1:
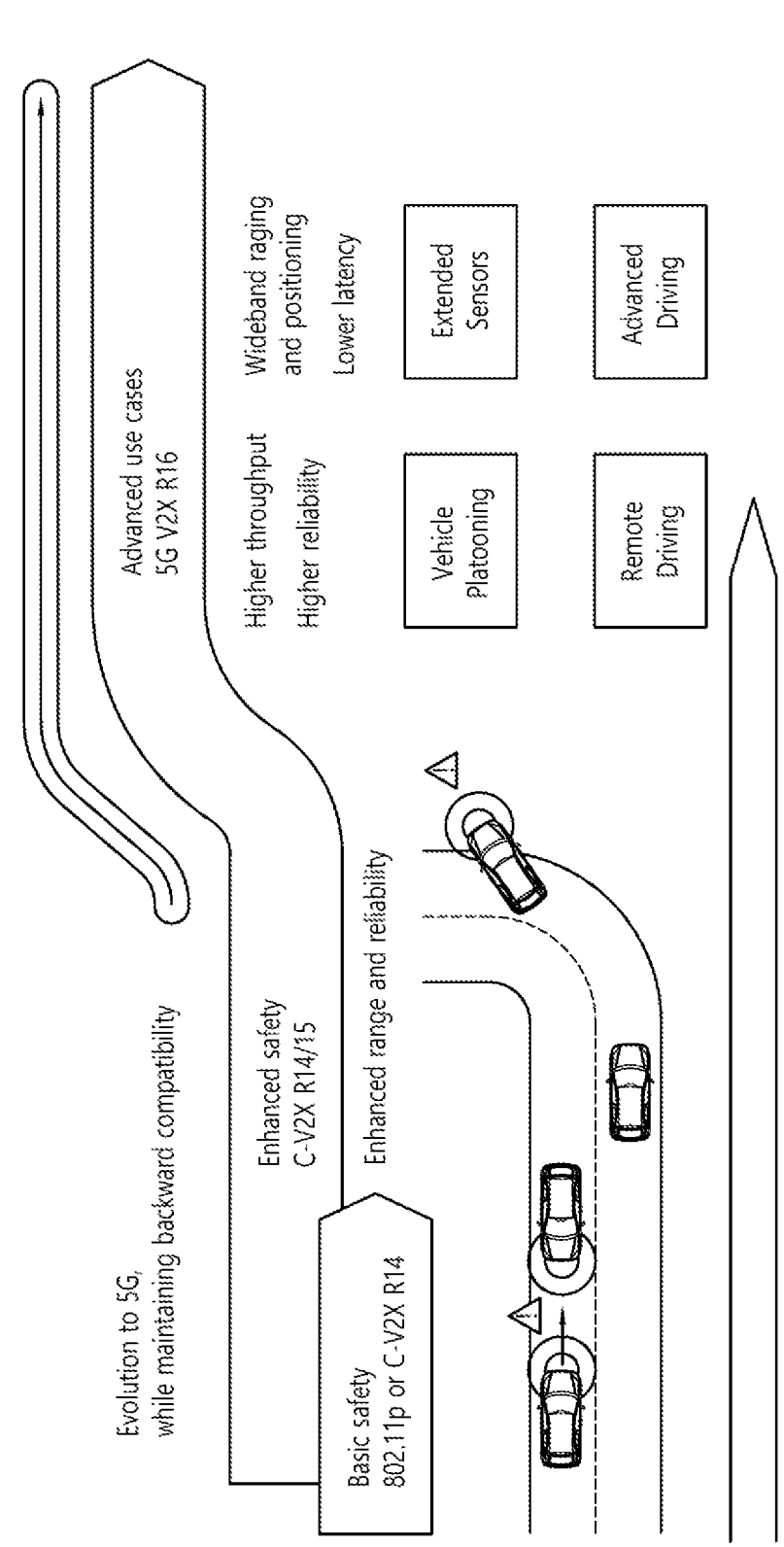
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
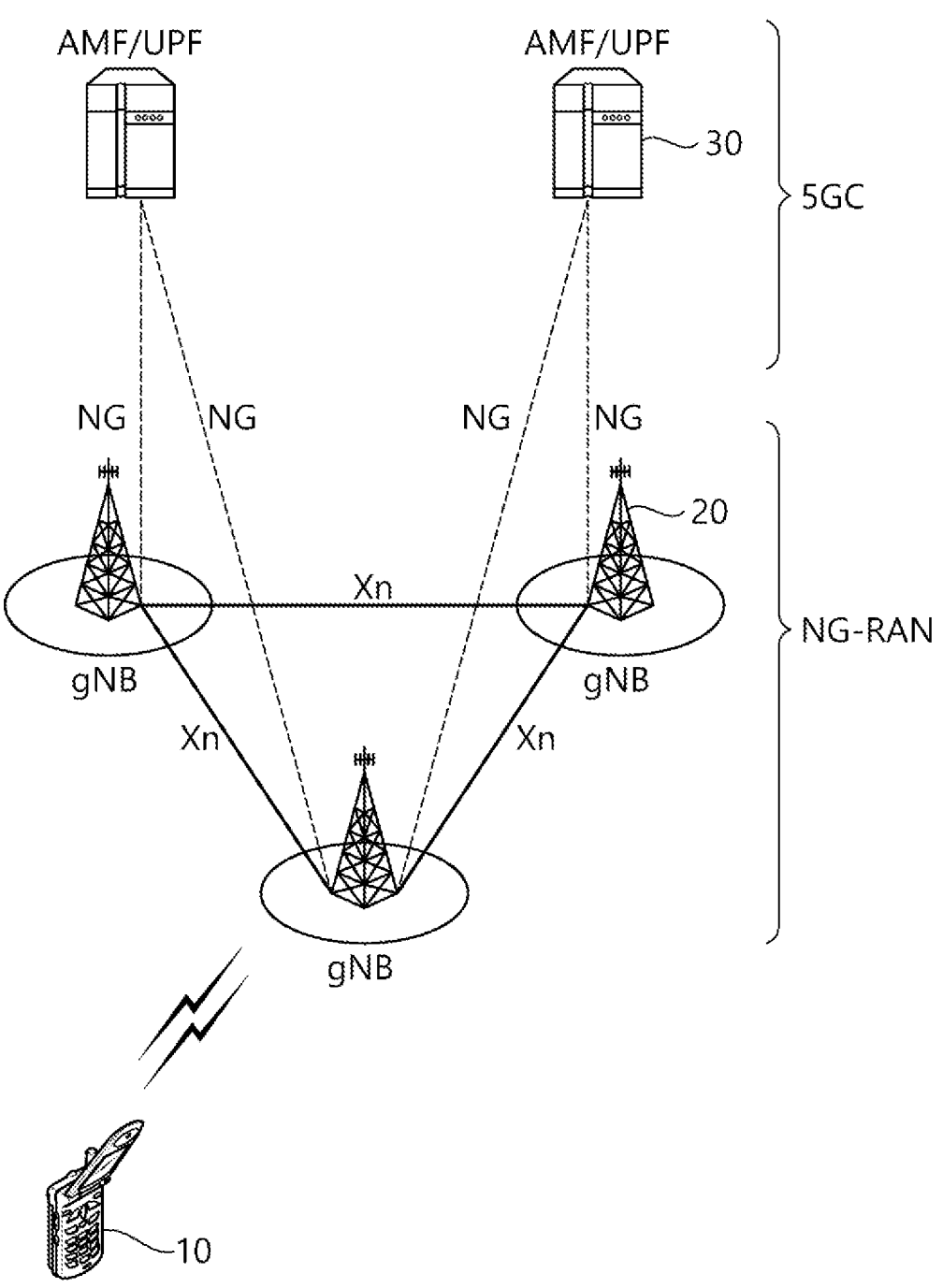
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
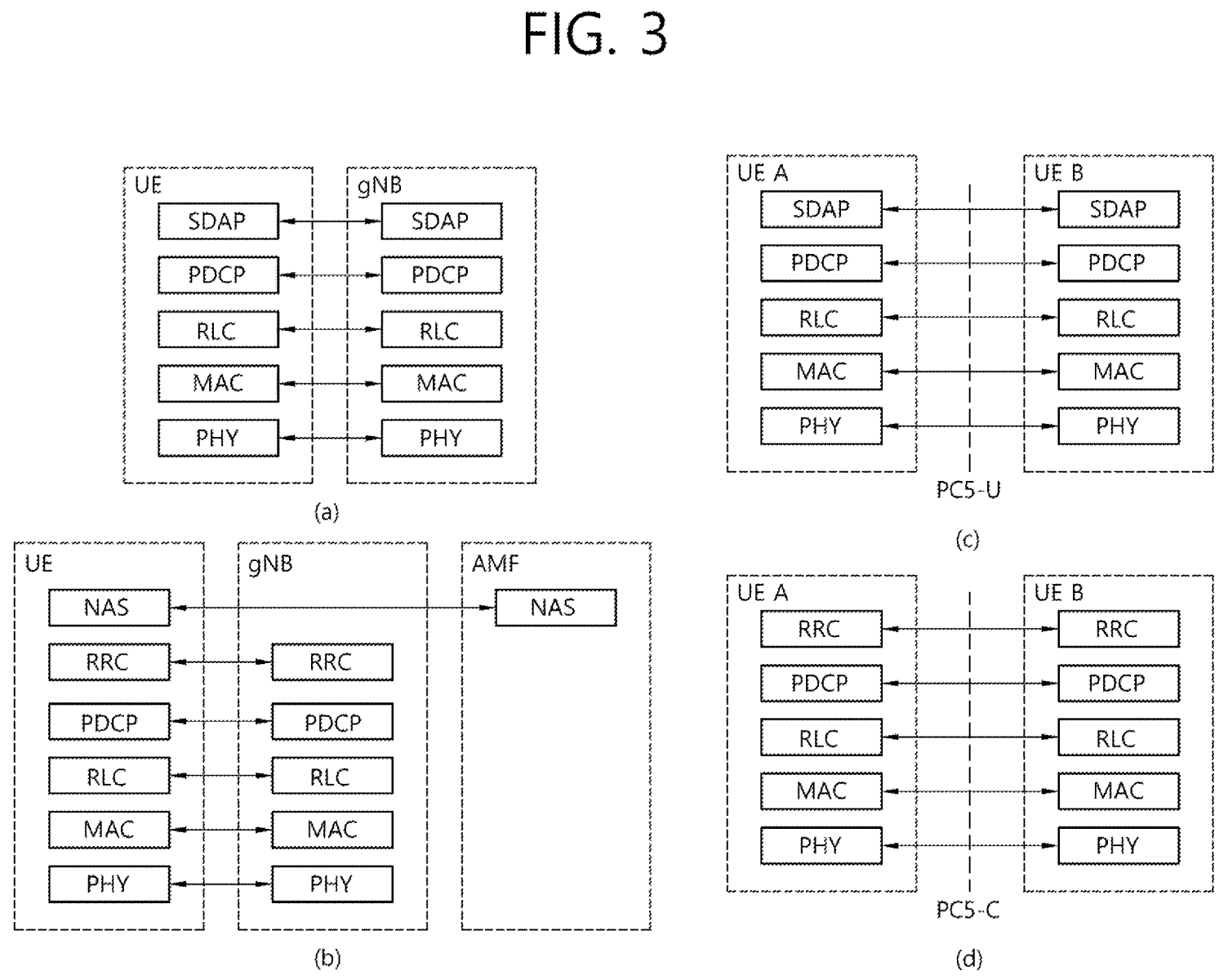

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
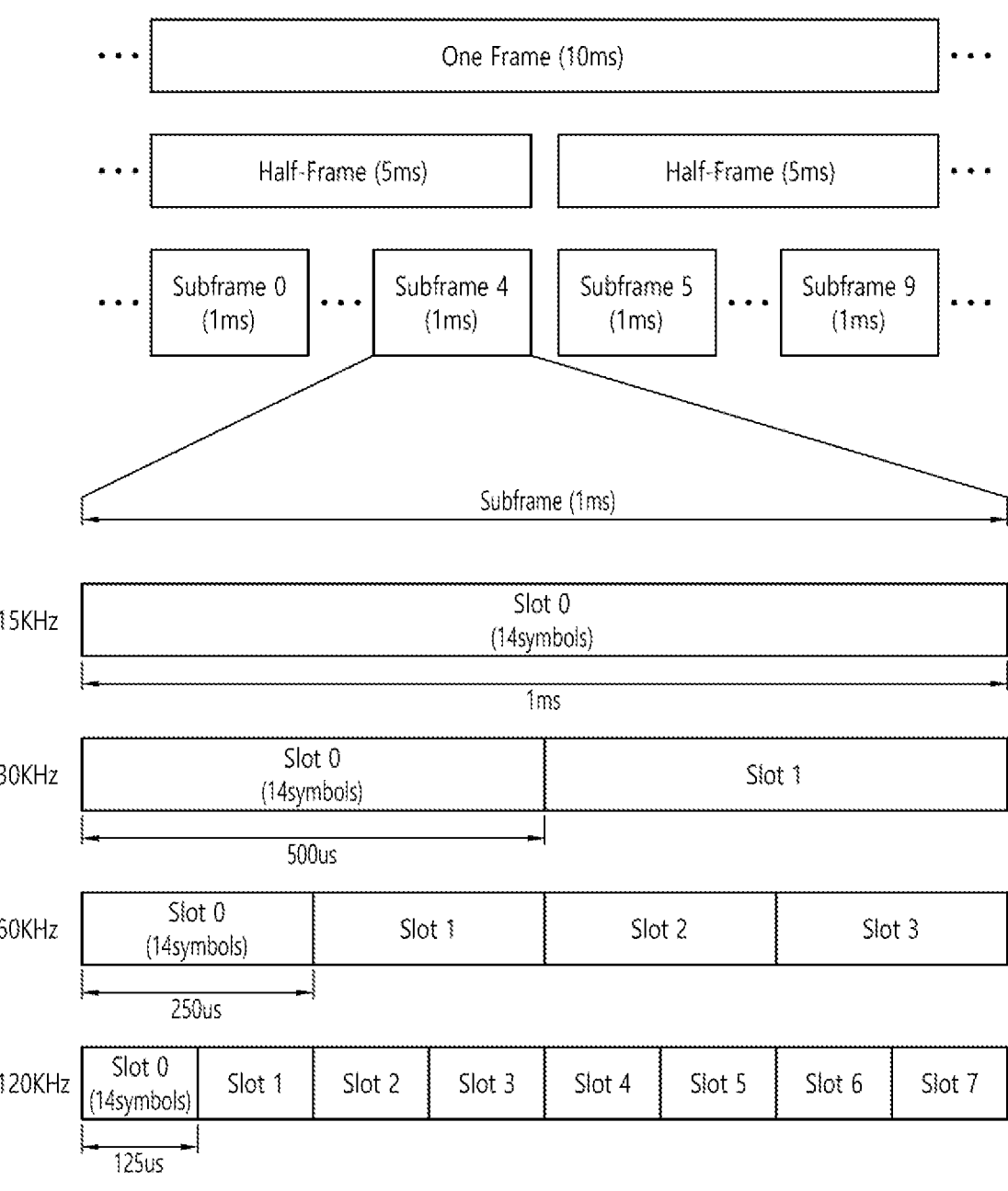
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
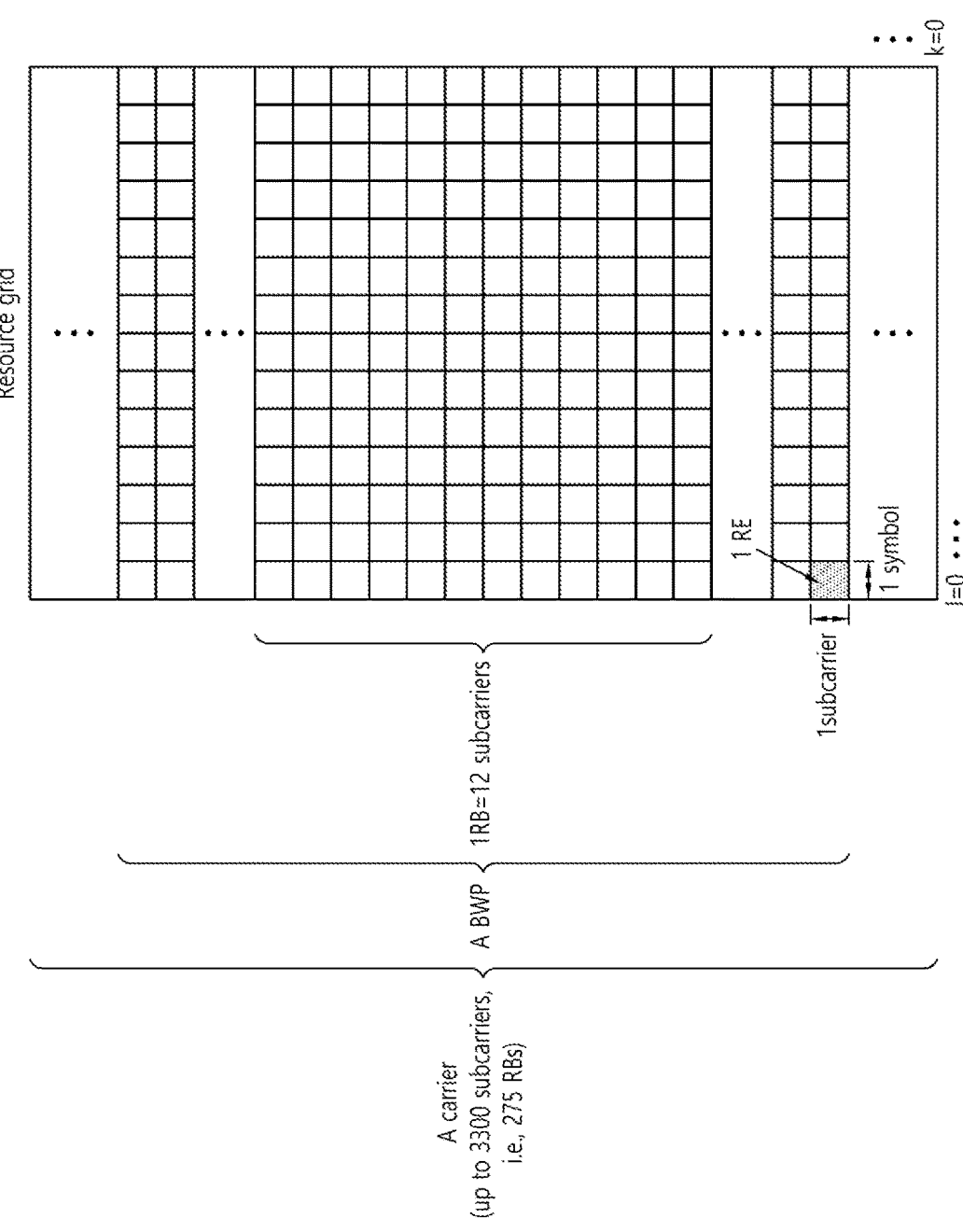
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
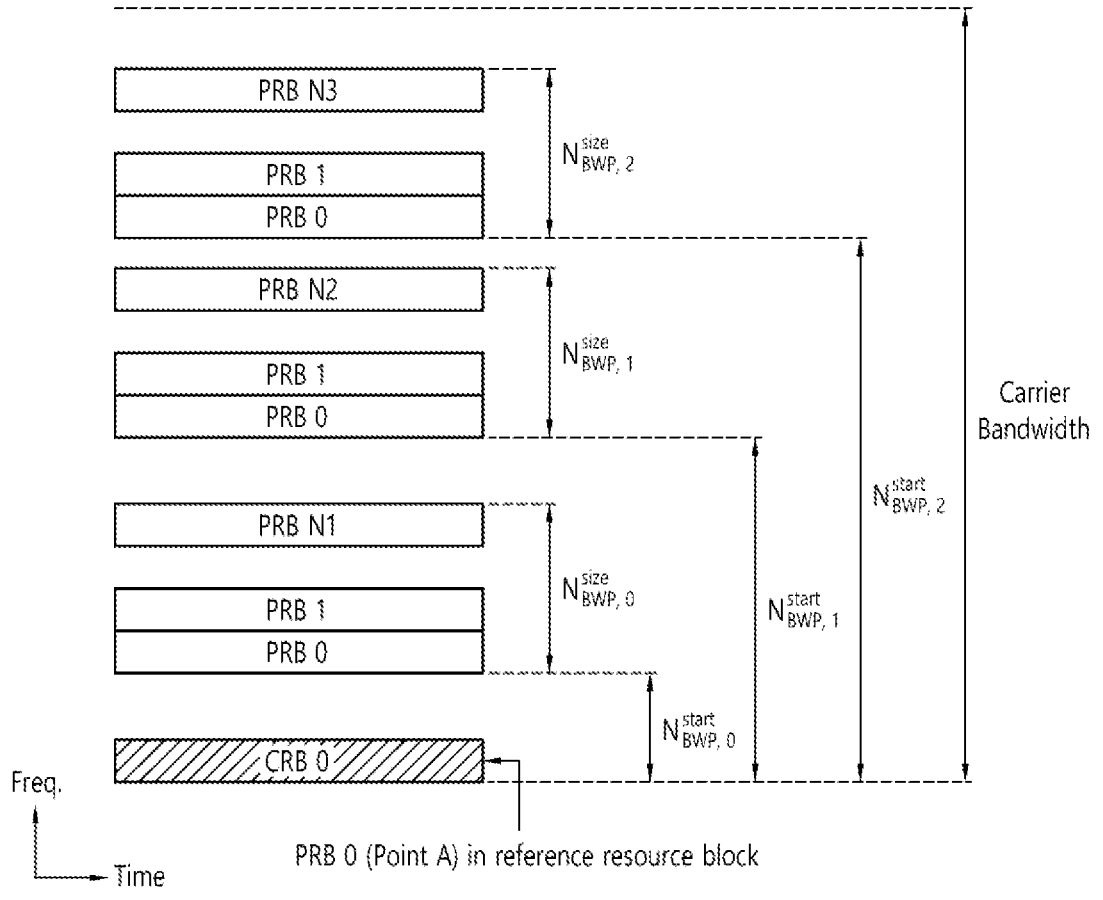
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
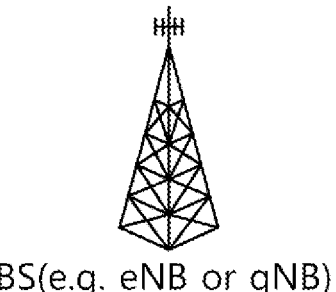
FIG. 7 shows a UE performing V2X or SL communication, based on an embodiment of the present disclosure.
Figure 7:
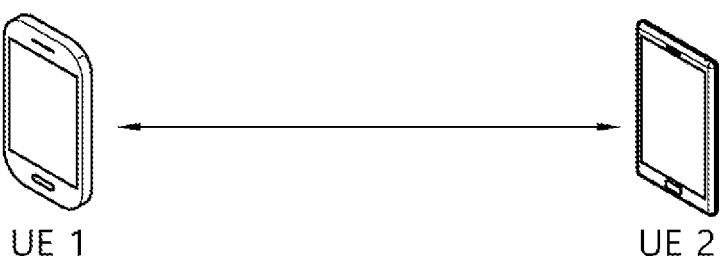

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
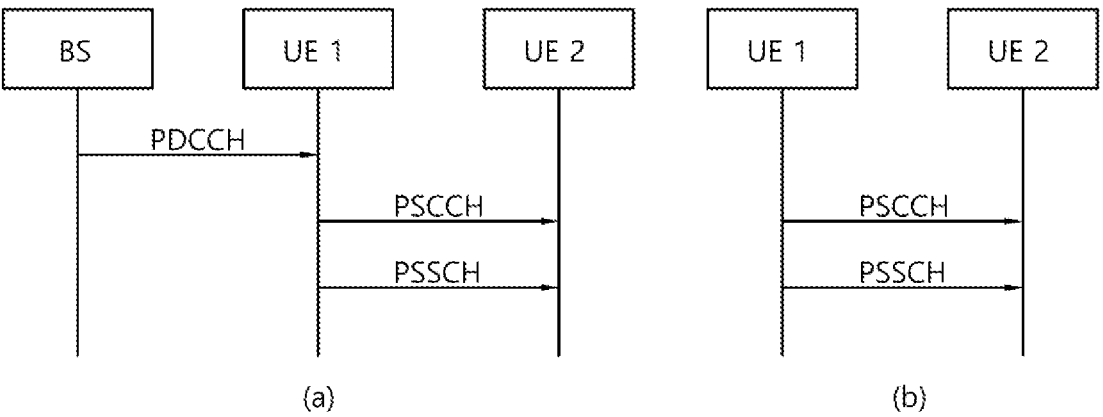
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
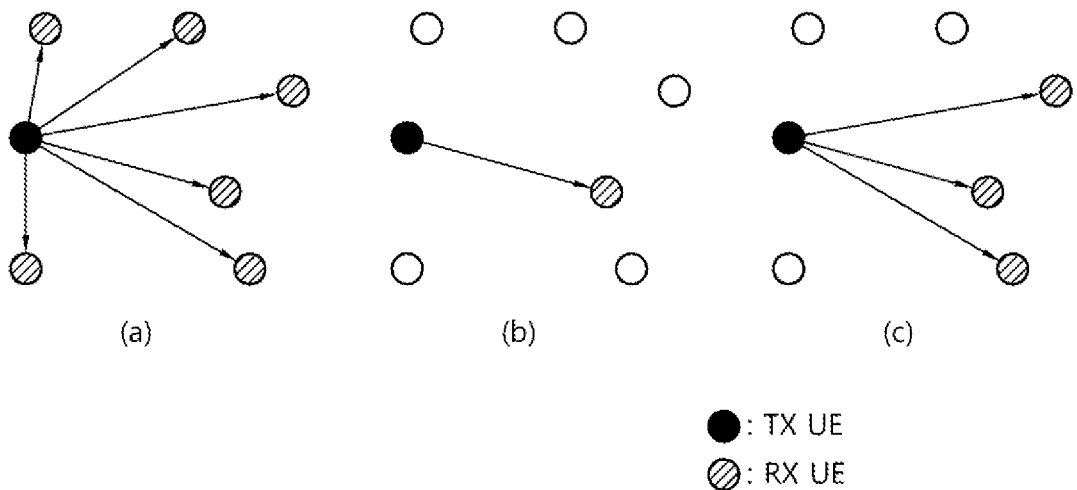
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, SL HARQ feedback may be enabled for unicast. In this case, in a non-Code Block Group (non-CBG) operation, when a receiving UE decodes a PSCCH targeting a receiving UE, and the receiving UE successfully decodes a transport block related to the PSCCH, the receiving UE may generate HARQ-ACK. In addition, the receiving UE may transmit the HARQ-ACK to the transmitting UE. On the other hand, If the receiving UE cannot successfully decode the corresponding transport block after decoding the PSCCH of which the target is the receiving UE, the receiving UE may generate the HARQ-NACK. In addition, the receiving UE may transmit HARQ-NACK to the transmitting UE.

For example, SL HARQ feedback may be enabled for groupcast. For example, in non-CBG operation, two HARQ feedback options may be supported for groupcast.

(1) Groupcast option 1: After a receiving UE decodes a PSCCH targeting a receiving UE, if the receiving UE fails to decode a transport block related to the PSCCH, the receiving UE may transmit a HARQ-NACK to the transmitting UE through a PSFCH. On the other hand, if a receiving UE decodes a PSCCH targeting the receiving UE, and the receiving UE successfully decodes a transport block related to the PSCCH, the receiving UE may not transmit a HARQ-ACK to a transmitting UE.

(2) Groupcast option 2: After a receiving UE decodes a PSCCH targeting a receiving UE, if the receiving UE fails to decode a transport block related to the PSCCH, the receiving UE may transmit a HARQ-NACK to the transmitting UE through a PSFCH. And, when a receiving UE decodes a PSCCH targeted to the receiving UE, and the receiving UE successfully decodes a transport block related to the PSCCH, the receiving UE may transmit an HARQ-ACK to a transmitting UE through a PSFCH.

For example, if groupcast option 1 is used for SL HARQ feedback, all UEs performing groupcast communication may share a PSFCH resource. For example, UEs belonging to the same group may transmit HARQ feedback using the same PSFCH resource.

For example, if groupcast option 2 is used for SL HARQ feedback, each UE performing groupcast communication may use different PSFCH resources for HARQ feedback transmission. For example, UEs belonging to the same group may transmit HARQ feedback using different PSFCH resources.

For example, when SL HARQ feedback is enabled for groupcast, a receiving UE may determine whether to transmit a HARQ feedback to a transmitting UE based on a Transmission-Reception (TX-RX) distance and/or RSRP.

For example, in the case of TX-RX distance-based HARQ feedback in groupcast option 1, if the TX-RX distance is less than or equal to a communication range requirement, a receiving UE may transmit a HARQ feedback for a PSSCH to a transmitting UE. On the other hand, if the TX-RX distance is greater than a communication range requirement, a receiving UE may not transmit a HARQ feedback for a PSSCH to a transmitting UE. For example, a transmitting UE may notify a receiving UE of the location of the transmitting UE through SCI related to the PSSCH. For example, the SCI related to the PSSCH may be the second SCI. For example, a receiving UE may estimate or obtain the TX-RX distance based on the location of the receiving UE and the location of a transmitting UE. For example, a receiving UE can know a communication range requirement used for a PSSCH by decoding SCI related to the PSSCH.

For example, in the case of resource allocation mode 1, the time (offset) between a PSFCH and a PSSCH may be configured or pre-configured. In the case of unicast and groupcast, if retransmission is required on SL, this may be indicated to a base station by a UE within coverage using a PUCCH. A transmitting UE may transmit an indication to a serving base station of the transmitting UE in a form such as a Scheduling Request (SR)/Buffer Status Report (BSR) rather than a HARQ ACK/NACK form. In addition, even if a base station does not receive the indication, the base station can schedule SL retransmission resource to the UE. For example, in the case of resource allocation mode 2, the time (offset) between a PSFCH and a PSSCH may be configured or pre-configured.

For example, from the viewpoint of transmission of a UE in a carrier, TDM between PSCCH/PSSCH and PSFCH may be allowed for a PSFCH format for SL in a slot. For example, a sequence-based PSFCH format having one symbol may be supported. Here, the one symbol may not be an AGC interval. For example, the sequence-based PSFCH format may be applied to unicast and groupcast.

For example, within a slot related to a resource pool, a PSFCH resource may be periodically configured to N slot duration or pre-configured. For example, N may be configured to one or more values of 1 or more. For example, N may be 1, 2 or 4. For example, HARQ feedback for transmission in a specific resource pool may be transmitted only through a PSFCH on the specific resource pool.

For example, when a transmitting UE transmits a PSSCH to a receiving UE in slots #X to #N, the receiving UE may transmit HARQ feedback for the PSSCH to the transmitting UE in slot #(N+A). For example, slot #(N+A) may include a PSFCH resource. Here, for example, A may be the smallest integer greater than or equal to K. For example, K may be the number of logical slots. In this case, K may be the number of slots in a resource pool. Or, for example, K may be the number of physical slots. In this case, K may be the number of slots inside and outside the resource pool.

For example, when a receiving UE transmits HARQ feedback on a PSFCH resource in response to one PSSCH transmitted by a transmitting UE to the receiving UE, the receiving UE may determine a frequency domain and/or a code domain of a PSFCH resource based on an implicit mechanism within a configured resource pool. For example, a receiving UE may determine the frequency domain and/or code domain of the PSFCH resource, based on at least one of a slot index related to PSCCH/PSSCH/PSFCH, a sub-channel related to PSCCH/PSSCH, and/or an identifier for distinguishing each receiving UE in a group for HARQ feedback based on groupcast option 2. And/or, for example, a receiving UE may determine the frequency domain and/or code domain of a PSFCH resource, based on at least one of SL RSRP, SINR, L1 source ID, and/or location information.

For example, when a HARQ feedback transmission through a PSFCH of a UE and a HARQ feedback reception through the PSFCH overlap, the UE may select either HARQ feedback transmission through PSFCH or HARQ feedback reception through PSFCH based on the prioritization rule. For example, the prioritization rule may be based on a minimum priority indication of the relevant PSCCH/PSSCH.

For example, when HARQ feedback transmission through PSFCH for a plurality of UEs of the UE overlaps, the UE may select a specific HARQ feedback transmission based on a prioritization rule. For example, the prioritization rule may be based on a minimum priority indication of the relevant PSCCH/PSSCH.

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or a PSCCH received from a transmitting UE, the following method may be considered or partly considered. Here, for example, the corresponding scheme or some schemes may be limitedly applied only when a receiving UE successfully decodes/detects a PSCCH for scheduling a PSSCH.

Option 1: transmit NACK information only when PSSCH decoding/reception fails

Option 2: transmit ACK information when PSSCH decoding/reception is successful, or transmit NACK information when fails Meanwhile, in various embodiments of the present disclosure, for example, a TX UE may transmit at least one of the following information to an RX UE through SCI. Here, for example, a TX UE may transmit at least one of the following information to an RX UE through first SCI and/or second SCI.

PSSCH (and/or PSCCH) related resource allocation information (e.g., location/number of time/frequency resources, resource reservation information (e.g., period))

SL CSI report request indicator or SL (L1) RSRP (and/or SL (L1) RSRQ and/or SL (L1) RSSI) report request indicator (on PSSCH) SL CSI transmission indicator (or SL (L1) RSRP (and/or SL (L1) RSRQ and/or SL (L1) RSSI) information transmission indicator)

Modulation and Coding Scheme (MCS) information transmission power information

L1 destination ID information and/or L1 source ID information

SL HARQ process ID information new data indicator (NDI) information redundancy version (RV) information (transmission traffic/packet related) QoS information (e.g., priority information)

SL CSI-RS transmission indicator or the number of (transmitted) SL CSI-RS antenna ports information location information of TX UE or location (or distance region) information of a target RX UE (where SL HARQ feedback is required)

information on decoding of data transmitted through PSSCH and/or a reference signal (e.g., DM-RS, etc.) related to channel estimation. For example, the information on a reference signal may be information related to the pattern of the (time-frequency) mapping resource of a DM-RS, RANK information, antenna port index information, etc.

Meanwhile, in various embodiments of the present disclosure, for example, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa, since a transmitting UE may transmit second SCI to a receiving UE through PSSCH. for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "definition" may mean (resource pool specific) (pre-)configuration (through predefined signaling (e.g., SIB, MAC, RRC, etc.)) from a base station or a network. For example, "A is configured" may mean "a base station/network transmits information related to A to a UE". Or, for example, "A is configured" may mean "A is designated through pre-defined signaling (e.g., PC5 RRC) between UEs".

Meanwhile, in various embodiments of the present disclosure, for example, "RLF" may be interpreted as mutually extended to at least one of out of synch (OOS) and in synch (IS). Meanwhile, in various embodiments of the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource configured within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be substituted/replaced with a configured grant (CG) and/or a semi-persistent scheduling grant (SPS). For example, DG may be substituted/replaced with a combination of CG and SPS grants. For example, a CG may include at least one of configured grant type 1 (CG type 1) and/or configured grant type 2 (CG type 2). For example, in CG type 1, a grant may be provided by RRC signaling and may be stored as a configured grant. For example, in CG type 2, a grant may be provided by a PDCCH, and may be stored or deleted as a configured grant based on L1 signaling indicating activation or deactivation of a grant. For example, in CG type 1, a base station may allocate a periodic resource to a TX UE through an RRC message. For example, in CG type 2, a base station may allocate a periodic resource to a TX UE through an RRC message, a base station may dynamically activate or deactivate the periodic resource through DCI.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, group-cast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

Meanwhile, in various embodiments of the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
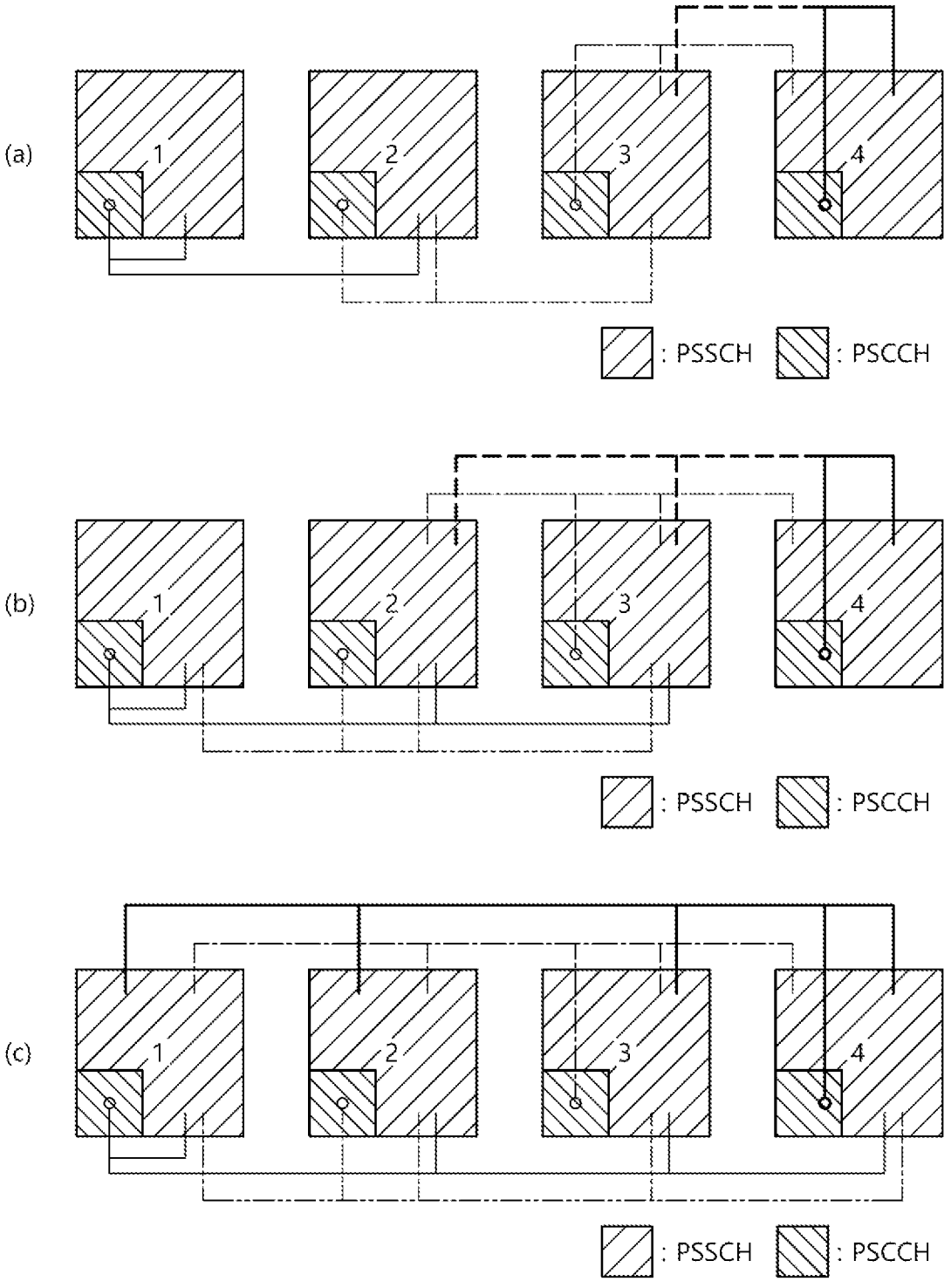
FIG. 10 shows a method in which a UE that has reserved transmission resource(s) informs another UE of the transmission resource(s), based on an embodiment of the present disclosure.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

According to an embodiment of the present disclosure (Embodiment 1), within the HE_PDU related (remaining) latency/delay budget, when the number of (minimum) retransmission resources above a pre-configured ratio (RTO_REQNUM) and/or a pre-configured threshold (THD_REQNUM) cannot be selected/supported among the required number of retransmission resources (HF_REQRSCNUM), or when the (minimum) number of retransmission resources (THD_RETXNUM) above the pre-configured threshold cannot be selected/supported, a transmitting UE may be configured to follow the (part of) following rules. Or, for example, if the number of (minimum) retransmission resources greater than or equal to the number of retransmission resources required within a selection window (TW_SELRSC) for selecting an HE_PDU related transmission resource and/or the (minimum) number of retransmission resources greater than or equal to a pre-configured threshold value cannot be selected/supported, a transmitting UE may be configured to follow the following rules. For example, the retransmission resource may be a retransmission resource based on HARQ feedback. For example, the HF_REQRSCNUM may indicate the maximum, minimum, or average number of retransmission resources. For example, the HE_PDU may indicate a transport block (TB) (or service) including a MAC PDU. For example, the latency/delay budget may include a packet delay budget.

Here, for example, for convenience of description, the number of retransmission resources required to be selected for HE_PDU is collectively referred to as "RETX_NUM". For example, HF_REQRSCNUM may be interpreted as a number of retransmissions (maximum, minimum, or average) pre-configured for each of the HE_PDU-related maximum (or minimum/average) (allowed) number of retransmissions configured/mapped to LCH (of the highest priority), the (maximum, minimum, or average) number of retransmissions determined by a UE implementation based on sidelink (SL) channel quality, etc., service priority/type, quality of service (QOS) requirements (eg, latency, reliability), (resource pool) congestion level (eg, channel busy ratio (CBR)), and/or resource pool. Also, for example, HE_PDU may be interpreted as a MAC PDU in which HARQ feedback (or HARQ) is enabled (HARQ feedback ENABLED), and/or a MAC PDU related to a logical channel (LCH) in which HARQ feedback (or HARQ) is enabled. For example, the number of (actual) selectable HARQ feedback-based retransmission resources (HF_ACTRSCNUM) in TW_SELRSC may be derived/calculated based on (A) "a time interval from the last symbol end of PSSCH transmission to the first symbol start of the linked PSFCH reception", determined by a PSFCH resource period pre-configured (resource pool specifically) and the minimum time gap between PSSCH and PSFCH, (B) "a (minimum) time interval required for PSFCH reception/detection, PSSCH retransmission preparation, TX-RX switching type, etc." and/or (C) the remainder excluding (time) resources (e.g., slots) corresponding to the (minimum) time interval required for SCI (e.g., 1st/2nd SCI) and/or data decoding. For example, resource selection may have to be performed to ensure a minimum time required for SCI (and/or data) decoding/processing among a plurality of (re)transmission resources related to a specific TB. In addition, for example, parameters (eg, HF_REQRSCNUM, RTO_REQNUM, THD_REQNUM, THD_RETXNUM, and RETX_NUM) related to the proposed method of the present disclosure and/or whether the proposed method is applied may be configured differently (or independently) specifically for service priority/type, QoS requirements, (resource pool) congestion level, resource pool, cast type (eg unicast, groupcast, broadcast), HARQ feedback scheme (eg, NACK only feedback or ACK/NACK feedback), and/or SL mode of operation (eg, MODE 1, MODE 2).

According to an embodiment of the present disclosure (Embodiment 1-1), HE_PDU related (re)transmission may be blindly retransmitted. For example, a blind retransmission may be a (re)transmission that disables the related HARQ feedback request. For example, the method may be interpreted as a kind of fallback transmission mode. Here, for example, if the rule applies, even if the HE_PDU related MAC PDU has the HARQ (feedback) enabled characteristic (HARQ ENABLED), during actual (re)transmission, an HARQ request field value on the related SCI may be interpreted as being designated as DISABLED (for example, a method in which a PHY layer finally determines the value of the HARQ request field on the SCI (regardless of the HARQ ENABLED characteristic of the MAC PDU)). Or, for example, if that rule applies, it may be interpreted that HE_PDU-related (re)transmission is performed based on a resource selected without considering the pre-configured minimum time gap between a PSSCH and a PSFCH, and the (minimum) time required for PSFCH reception and PSSCH retransmission preparation (eg, a resource selected for a blind retransmission operation). Also, for example, when applying that rule, through blind retransmission (or HARQ DISABLED (re)transmission), the required (maximum, minimum, or average) number of retransmissions related to the HE_PDU may be satisfied (as much as possible).

According to an embodiment of the present disclosure (Embodiment 1-2), it is possible to select the maximum possible number (MAX_FDRSC) of retransmission resources (based on HARQ feedback) in TW_SELRSC. Here, for example, the required number of retransmission resources excluding MAX_FDRSC (e.g., (RETX_NUM-MAX_FDRSC) or (HF_REQRSCNUM-MAX_FDRSC)) may not be selected, and a retransmission operation based thereon may be interpreted as being omitted.

According to an embodiment of the present disclosure (Embodiment 1-3), resource reselection may be configured to be triggered until RETX_NUM (HARQ feedback-based) retransmission resources can be selected within TW_SELRSC.

According to an embodiment of the present disclosure, a MAC layer may be configured to finally select one of the above-described proposed schemes (Embodiments 1-1, 1-2, and 1-3).

According to an embodiment of the present disclosure (Embodiment 1-4), if the reason that RETX_NUM (in HARQ feedback-based) retransmission resources cannot be selected (in TW_SELRSC) is based on congestion control (for example, when it is not possible to select as many retransmission resources as required due to the limit of the maximum allowable CR value), exceptionally, Embodiment 1-2 (or Embodiment 1-3) (not Embodiment 1-1) may be configured to be applied. For example, the method (Embodiment 1-4) may be interpreted as a method of maintaining HARQ feedback-based retransmission. Here, for example, when the corresponding rule (Embodiment 1-4) is applied, the value of the HARQ request field on the HE_PDU (re)transmission related SCI may be designated as ENABLED.

According to an embodiment of the present disclosure (Embodiment 1-5), HE_PDU (re)transmission may be configured to be omitted. For example, if an HARQ (feedback) DISABLED MAC PDU (and/or a MAC PDU related to an HARQ (feedback) DISABLED LCH) exists (on the buffer), the omission of the HE_PDU (re)transmission may be to perform transmission resource selection for this (instead). Or, for example, (re)transmission of the required number of (HARQ feedback-based) (re)transmissions other than MAX_FDRSC (e.g., (RETX_NUM-MAX_FDRSC) or (HF_REQRSCNUM-MAX_FDRSC)) (related to HE_PDU) (in TW_SELRSC) may be configured to be omitted.

According to an embodiment of the present disclosure (Embodiment 1-6), HE_PDU related (RETX_NUM) retransmission resources may be selected as a combination of HARQ feedback-based retransmission resources and blind retransmission resources (in TW_SELRSC). For example, this method can be interpreted as a kind of fallback transmission mode. Here, for example, through this, the number of (maximum, or average) retransmissions required in the HE_PDU related TW_SELRSC may be satisfied (as much as possible). Also, for example, when a corresponding rule is applied, it may be applied in the following manner.

(A) For example, after selecting (preferentially) retransmission resources based on HARQ feedback (as much as possible) (and/or (preferentially) performing a retransmission operation based on HARQ feedback (as much as possible)), the number of remaining retransmission resources may be selected as blind retransmission resources (and/or performed as a blind retransmission operation). For example, in HARQ feedback-based retransmission resource selection and HARQ feedback-based retransmission operation, an HARQ feedback request field on the related SCI may be set to ENABLED and transmitted. For example, on the last resource related to HARQ feedback-based retransmission (exceptionally), an HARQ feedback request field on the SCI may be set to DISABLED and transmitted. For example, in selecting a blind retransmission resource and performing a blind retransmission operation, an HARQ feedback request field on the related SCI may be set to DISABLED and transmitted.

(B) For example, after selecting (preferentially) blind retransmission resources (as much as possible) (and/or performing a blind retransmission operation (preferentially) (as much as possible)), the remaining number of retransmission resources may be selected as HARQ feedback-based retransmission resources (and/or performed as an HARQ feedback-based retransmission operation). Here, for example, a blind retransmission resource may be selected on the remaining resources (after) excluding "the time interval between a PSSCH and a linked PSFCH and the time interval between the (corresponding) PSFCH and a PSSCH (eg, PSSCH for retransmission)" selected for retransmission operation based on HARQ feedback. For example, on the last resource related to blind retransmission (exceptionally), an HARQ feedback request field on the SCI may be set to ENABLED and transmitted.

In addition, for example, the ratio between an HARQ feedback-based retransmission resource and a blind retransmission resource (RTO_HARQBD) may be configured differently for each service priority/type, QoS requirement, (resource pool) congestion level, resource pool, cast type, HARQ feedback scheme, and/or SL operation mode.

Figure 11:
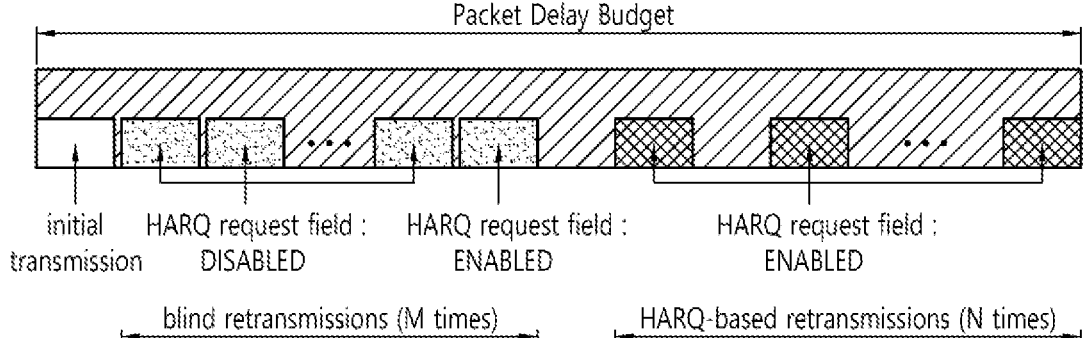
FIG. 11 shows resources related to blind retransmission and HARQ-based retransmission, selected within a packet delay budget (PDB), according to an embodiment of the present disclosure.

FIG. 11 shows resources related to blind retransmission and HARQ-based retransmission, selected within a packet delay budget (PDB), according to an embodiment of the present disclosure. The embodiment of FIG. 11 may be combined with various embodiments of the present disclosure.

Referring to FIG. 11, resources related to initial transmission, blind retransmission, and HARQ-based retransmission of a MAC PDU in PDB may be selected. For example, in consideration of all initial transmission, blind retransmission, and HARQ-based retransmission in relation to the PDB, the total number of required transmissions related to the MAC PDU may be M+N+1. That is, when a retransmission resource is selected as shown in FIG. 11, the total number of transmissions required related to the MAC PDU may be satisfied. For example, after initial transmission, a blind retransmission resource may be selected before HARQ-based retransmission. For example, the blind retransmission resource may be reserved M times. In this case, in the blind retransmission resources other than the last among the M blind retransmission resources, the HARQ request field on the related SCI may have a DISABLED value. Exceptionally, the HARQ request field on the SCI of the last resource among the M blind retransmission resources may have an ENABLED value. For example, after the M blind retransmission resources, the HARQ-based retransmission resource may be reserved N times. The HARQ request field on the N HARQ-based retransmission resource related SCI may have an ENABLED value.

According to an embodiment of the present disclosure (Embodiment 2), when (as described above) TB (eg, MAC PDU) related (re)transmission is configured/selected by a combination of HARQ feedback-based retransmission and blind retransmission (MIX_MODE) (and/or (above) when Embodiment 1 is applied), (a part of) below rules may apply. Here, for example, whether the MIX_MODE method is applied (allowed) may be configured differently for each service priority/type, QoS requirement, (resource pool) congestion level, resource pool, cast type, HARQ feedback scheme, and/or SL operation mode.

For example, a TB to which the proposed rule is applied may be (limitedly) interpreted as a HARQ (feedback) ENABLED MAC PDU and/or a HARQ (feedback) ENABLED LCH related MAC PDU. Also, for example, "blind retransmission" wording in this disclosure may be interpreted as an operation of performing retransmission for a specific TB, before receiving (requested) HARQ feedback information from a receiving UE, and/or before the time required for PSFCH processing (and/or PSSCH/PSCCH retransmission preparation) passes from an (expected) time point of (requested) HARQ feedback transmission of a receiving UE. For example, the blind retransmission may be interpreted as a situation in which a transmitting UE transmits the first transmission of a specific TB; after the transmitting UE transmits the HARQ feedback request field value on the SCI related to the first transmission to ENABLED, before receiving the HARQ feedback related to the first transmission from the receiving UE (related to the same TB), the transmitting UE transmits the second transmission; the transmitting UE sets the value of the HARQ feedback request field on the SCI related to the second transmission to ENABLED (or DISABLED) and transmits it. Or, for example, performing retransmission before receiving HARQ feedback information from a receiving UE may include setting to ENABLED and transmitting the HARQ feedback request field on the SCI (exceptionally) on the last resource related to blind retransmission. Or, for example, the operation of performing retransmission before receiving an HARQ feedback information from the receiving UE may be interpreted as a retransmission operation performed without requesting the HARQ feedback information to the receiving UE (on SCI).

For example, the wording "MIX_MODE" in this disclosure may be interpreted (limitedly) as sequentially performing blind retransmission and HARQ feedback-based retransmission for a specific TB, and/or sequentially performing HARQ feedback-based retransmission and blind retransmission. Also, for example, an indicator (field) of whether to perform the MIX_MODE operation may be defined on SCI (eg, 1st/2nd SCI). Alternatively, for example, information on whether to perform the MIX_MODE operation may be signaled through a combination of (existing) field values on SCI and/or a 2nd SCI format indicator. Or, for example, (whether to perform or not) MIX_MODE related information may be exchanged/configured between (unicast) UEs through PC5 RRC signaling. For example, the MIX_MODE-related information may include information on the number/ratio between (TB-related) blind retransmission and HARQ feedback-based retransmission. For example, the 2nd SCI format may be a separately defined 2nd SCI format designated for MIX_MODE.

According to an embodiment of the present disclosure (Embodiment 2-1), for a specific TB, (all of) HARQ request field value(s) may be designated as ENABLED (or DISABLED) on the relevant SCI. For example, when operating with MIX_MODE, for a specific TB, (all of) HARQ request field value(s) may be designated as ENABLED (or DISABLED) on SCI related to blind retransmission and retransmission based on HARQ feedback. Here, for example, when the corresponding rule is applied, the problem of omission of a required retransmission operation by a transmitting UE during GC HARQ operation based on NACK only feedback can be alleviated. As a specific example, when a transmitting UE performs blind retransmission after an initial transmission related to a specific TB, when the transmitting UE designates the value of the HARQ request field as DISABLED on SCI related to the initial transmission and performs retransmission based on HARQ feedback (related to the same TB), in case that the HARQ request field value is specified as ENABLED in SCI related to the retransmission, if the receiving UE fails in the initial transmission decoding and does not receive the retransmission due to a half duplex problem, PSCCH decoding failure, etc., the receiving UE will not perform HARQ feedback transmission (for the initial transmission) to the transmitting UE, and thereby, the transmitting UE assumes that the receiving UE has successfully received the TB. That is, a problem in which necessary retransmission is omitted may occur. On the other hand, for example, under the same circumstances, when performing blind retransmission after initial transmission related to a specific TB and when performing retransmission based on HARQ feedback (related to the same TB), if the value of the HARQ request field on the related SCI is set to ENABLED, the receiving UE feeds back NACK information on the initial transmission decoding failure to the transmitting UE, and the transmitting UE may perform retransmission to the receiving UE based on this.

Figure 12:
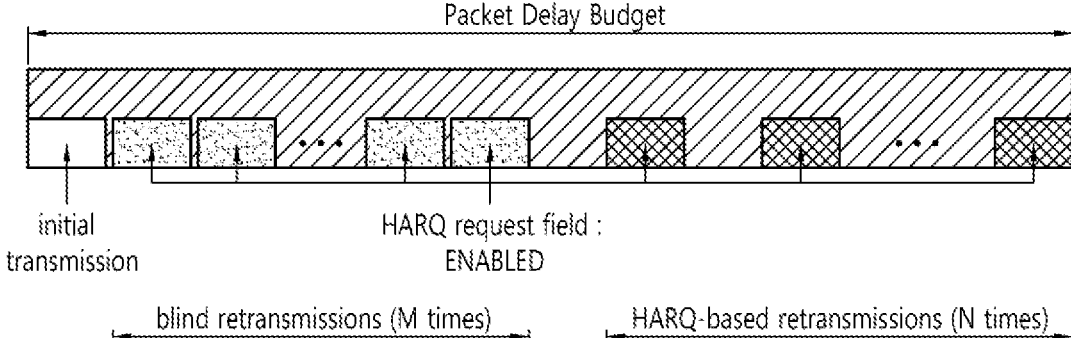
FIG. 12 shows resources related to blind retransmission and HARQ-based retransmission, selected within a packet delay budget (PDB), according to an embodiment of the present disclosure.

FIG. 12 shows resources related to blind retransmission and HARQ-based retransmission, selected within a packet delay budget (PDB), according to an embodiment of the present disclosure. The embodiment of FIG. 12 may be combined with various embodiments of the present disclosure.

Referring to FIG. 12, resources related to initial transmission, blind retransmission, and HARQ-based retransmission of a MAC PDU in the PDB may be selected. For example, in consideration of all initial transmission, blind retransmission, and HARQ-based retransmission in relation to the PDB, the total number of required transmissions related to the MAC PDU may be M+N+1. That is, when retransmission resources are selected as shown in FIG. 12, the total number of transmissions required related to the MAC PDU may be satisfied. For example, after initial transmission, a blind retransmission resource may be selected before HARQ-based retransmission. For example, the blind retransmission resource may be reserved M times. In this case, the HARQ request field on the SCI related to the M blind retransmission resources may have an ENABLED value. For example, after the M blind retransmission resources, the HARQ-based retransmission resource may be reserved N times. The HARQ request field on the N HARQ-based retransmission resource related SCI may have an ENABLED value. That is, in SCI related to all retransmissions selected in FIG. 12, the HARQ request field may have an ENABLED value.

According to an embodiment of the present disclosure (Embodiment 2-2), for a specific TB, when operating with MIX_MODE, an HARQ request field value may be designated as DISABLED on blind retransmission related SCI, and an HARQ request field value may be designated as ENABLED on retransmission related SCI based on HARQ feedback.

For example, whether Example 2-1 (or Example 2-2) is applied may be configured differently for each service priority/type, QoS requirement, (resource pool) congestion level, resource pool, cast type, and/or HARQ feedback scheme, and/or SL operation mode. For example, when whether to apply the above-described embodiment is configured based on service priority/type, in the case of a service having a (relatively) high priority (rather than a pre-configured threshold value), it may be configured in the form of applying Example 2-1 (or Example 2-2). For example, when whether to apply the above-described embodiment is configured based on (resource pool) congestion level, when a (relatively) high degree of congestion (than a pre-configured threshold value) is measured, it may be configured in the form of applying Example 2-1 (or Example 2-2). For example, when whether to apply the above-described embodiment is configured based on HARQ feedback scheme, when the NACK only feedback method (or the ACK/NACK feedback method) is used, it may be configured in a form to apply Example 2-1 (or Example 2-2).

For example, when GC HARQ operation based on NACK only feedback is performed, a transmitting UE will always perform retransmission when NACK information is fed back from a receiving UE for an initial TB-related transmission (for example, the HARQ feedback request field on the relevant SCI may be designated as ENABLED), but if HARQ feedback is not received for the initial transmission (from the viewpoint of the transmitting UE) (i.e., for example, this case may be regarded as ACK), it may be ambiguous (from the perspective of the transmitting UE) whether the receiving UE actually succeeded in initial transmission decoding, or whether the receiving UE did not receive the initial transmission due to a half-duplex problem or PSCCH decoding failure. In consideration of this, for example, a transmitting UE may be configured to perform retransmission even if HARQ feedback is not received for initial transmission. Here, for example, the corresponding operation may be interpreted as a type of blind retransmission. For another example, when the ACK/NACK feedback operation is performed, a transmitting UE considers it as a NACK (or DTX) state and performs retransmission under the example situation (for example, when HARQ feedback is not received from the receiving UE for the initial transmission).

According to an embodiment of the present disclosure (Embodiment 2-2), a method of transmitting a specific TB (eg, MAC PDU) in MIX_MODE (or blind retransmission form) may be considered to be limitedly applied/allowed only when the following (some) conditions are satisfied, and/or may be regarded as implicitly transmitting a specific TB in MIX_MODE (or blind retransmission form) if the following (some) conditions are satisfied.

When transmitting HARQ (feedback) ENABLED (or DISABLED) MAC PDU

When performing a plurality of (re)transmission related to a specific TB on a plurality of PSSCH (and/or PSCCH) slots linked to one PSFCH slot (for example, i) before performing transmission on a PSSCH and/or PSCCH slot, and receiving HARQ feedback from a receiving UE on the linked PSFCH SLOT, ii) a case in which retransmission is performed on another PSSCH (and/or PSCCH) slot related to the corresponding PSFCH slot before the time required for PSFCH processing (and/or PSSCH/PSCCH retransmission preparation) from the linked PSFCH slot passes, and/or iii) when a plurality of (re)transmissions related to a specific TB are performed (each) on a plurality of PSSCH (and/or PSCCH) slots in which different PSFCH slots are linked).

Here, for example, when the above condition is satisfied, for example, when a plurality of (re)transmissions related to a specific TB are performed on a plurality of PSSCH (and/or PSCCH) slots linked to one PSFCH slot, the Embodiment 2-1 may be applied. Otherwise, for example, when a plurality of (re)transmissions related to a specific TB are performed (each) on a plurality of PSSCH (and/or PSCCH) slots in which different PSFCH slots are linked, the Embodiment 2-2 may be applied.

Here, for example, an operation of performing a plurality of (re)transmission related to a specific TB on a plurality of PSSCH (and/or PSCCH) slots related to one PSFCH slot may be possible only when the PSFCH resource period is configured to 2 (slots) or more. In consideration of this, for example, whether the operation based on the embodiment 2-1 (or embodiment 2-2) and the operation based on the embodiment 2-1 (or embodiment 2-2) is allowed may be configured differently for each PSFCH resource period.

If a PSFCH resource is not located (or located) between (some) (TB-related) MODE 1 transmission resources (scheduled from a base station)

When the time interval between (some) (TB-related) MODE 1 transmission resources is smaller (or larger) than the (minimum) processing time (and/or time required for SCI/data decoding) required to perform PSFCH (eg, HARQ feedback reception)-based retransmission When the (minimum) HARQ RTT timeline is not guaranteed (or guaranteed) with the time interval between (some) (TB-related) MODE 1 transmission resources Here, for example, MIX_MODE may be configured to be applied even when the (TB-related) MODE 2 (re)transmission resource selection result satisfies the above conditions. And/or, for example, it may be configured to perform blind retransmission even when the (TB-related) MODE 2 (re) transmission resource selection result satisfies the above conditions. And/or, it may be configured to transmit only HARQ (feedback) DISABLED MAC PDUs even when the (TB-related) MODE 2 (re)transmission resource selection result satisfies the above conditions. For example, in this case, transmission of the HARQ (feedback) ENABLED MAC PDU may be interpreted as being omitted. Here, for example, application of such a rule may be limited only to (some) transmission resources that satisfy the above conditions.

Here, for another example, when the above condition is satisfied, only HARQ (feedback) DISABLED MAC PDU may be considered to be transmitted through the relevant MODE 1 SL GRANT. For example, when only the HARQ (feedback) DISABLED MAC PDU is considered to be transmitted, the transmission of the HARQ (feedback) ENABLED MAC PDU may be omitted. And/or, when the above condition is satisfied, only HARQ (feedback) DISABLED LCH (and/or HARQ (FEEDBACK) ENABLED LCH) for the relevant MODE 1 SL GRANT (eg, SL CG TYPE 1) may be configured to be mapped. And/or, if the above condition is satisfied, even if HARQ (feedback) ENABLED MAC PDU transmission is allowed through the relevant MODE 1 SL GRANT, it may be configured to designate a value of an HARQ request field on SCI related to the transmitted MAC PDU as DISABLED. For example, designating a value of an HARQ request field on SCI related to the transmitted MAC PDU as DISABLED may be interpreted as a kind of blind retransmission form. And/or, if the above condition is satisfied, a transmitting UE may be (allowed) to perform HARQ (feedback) ENABLED MAC PDU transmission through the relevant MODE 1 SL GRANT, wherein an HARQ request field value on SCI may be designated as ENABLED, the receiving UE receiving this may be configured to assume that the PSSCH (and/or PSCCH) transmission is a blind retransmission in which an HARQ feedback request is implicitly set to DISABLED. Otherwise (for example, in a situation where all PSFCH resources are located between (TB-related) MODE 1 transmission resources), an HARQ (feedback) ENABLED (and/or DISABLED) MAC PDU may be considered to be transmitted (limitedly) through MODE 1 SL GRANT. For example, in a situation where all PSFCH resources are located between (TB-related) MODE 1 transmission resources, an HARQ (feedback) ENABLED (and/or DIS-ABLED) MAC PDU may be considered to be transmitted (limitedly) through MODE 1 SL GRANT. Here, for example, application of such a rule may be limited only to (a part of) transmission resources that satisfy the above conditions.

when (a part of) the number of HARQ feedback-based retransmission resources required (in relation with a TB) cannot be selected within the selection window (or TB-related latency/delay budget)

According to an embodiment of the present disclosure (Embodiment 3), when a transmitting UE performs TB (eg, MAC PDU) related (re)transmission with MIX_MODE, the receiving UE may perform HARQ feedback transmission (eg, PSFCH) according to the following (some) rules. Here, for example, the corresponding proposal rule may be configured to be (limitedly) applied when the (described above) embodiment 2-1 is performed.

It may be configured (Embodiment 3-1) to perform HARQ feedback for each (TB-related) PSSCH/PSCCH (re)transmission received on a plurality of PSSCH/PSCCH slots related to one PSFCH slot, and/or a slot (LINK_DSLOT) in which (TB-related) PSSCH/PSCCH (re)transmission is performed (for example, it may be interpreted in the form of transmitting HARQ feedback for each TB-related initial transmission/re-transmission) (for example, the PSFCH slots related to the plurality of PSSCHs/PSCCHs may be different). And/or, it may be configured (Embodiment 3-2) to transmit (one) HARQ feedback through a PSFCH resource derived based on a related parameter of a randomly selected one among (TB related) PSSCH/PSCCH received on a PSFCH resource derived based on the last (or first, or pre-configured sequence number) received (TB related) PSSCH/PSCCH parameter (e.g., (L1) SOURCE/DESTINATION ID, PSSCH related start subchannel index, number of subchannels, and/or slot index, etc.) on LINK_DSLOT, or LINK_DSLOT. For example, in transmission of HARQ feedback according to Embodiment 3-2, in case decoding succeeds in at least one of PSSCH/PSCCH received on LINK_DSLOT, or when decoding succeeds as a result of HARQ COMBINE of PSSCH received on LINK_D-SLOT, ACK information may be transmitted, other-wise, NACK information may be transmitted.

Here, as another example, when Embodiment 3-1 is applied, if at least one of the (TB related) PSSCH/PSCCH received on LINK_DSLOT succeeds in decoding, or if decoding is successful with the HARQ COMBINE result of a (TB related) PSSCH received on LINK_DSLOT, a receiving UE may repeatedly transmit ACK information through a PSFCH resource related to each PSSCH/PSCCH. On the other hand, if all decoding of (TB related) PSSCH/PSCCHs received on LINK_DSLOT fail, or the HARQ COMBINE result of (TB related) PSSCH received on LINK_DSLOT is decoding failure, a receiving UE may repeatedly transmit NACK information through a PSFCH resource related to each PSSCH/PSCCH.

Figure 13:
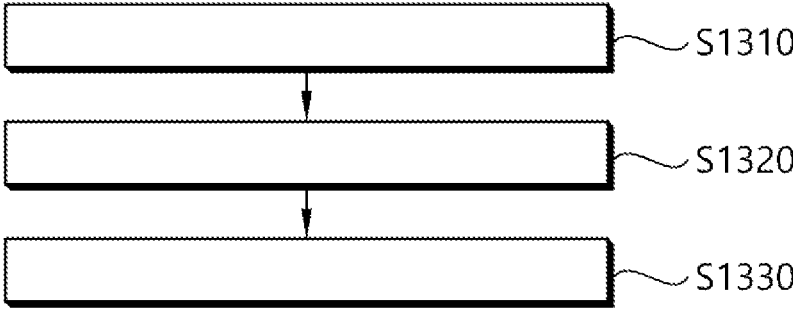
FIG. 13 shows a procedure in which a first device performs wireless communication, according to an embodiment of the present disclosure.

FIG. 13 shows a procedure in which a first device performs wireless communication, according to an embodiment of the present disclosure. The embodiment of FIG. 13 may be combined with various embodiments of the present disclosure.

Referring to FIG. 13, in step S1310, the first device may transmit sidelink control information (SCI), to a second device, through a physical sidelink control channel (PSCCH). In step S1320, the first device may perform an initial transmission of a medium access control (MAC) protocol data unit (PDU), to the second device, through a physical sidelink shared channel (PSSCH) based on the SCI. In step S1330, the first device may perform N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB. For example, a number of the initial transmission, the N blind retransmissions and the M HARQ-based retransmissions may be the same as the transmission number related to the PSSCH required in the PDB, the MAC PDU may be generated based on a logical channel (LCH) in which an HARQ feedback is enabled, and the N or the M may be a zero or a positive integer.

For example, an HARQ feedback may be disabled for each of the N blind retransmissions, based on a field related to HARQ feedback application of SCI related to the each of the N blind retransmissions.

For example, an HARQ feedback may be enabled for each of the M HARQ-based retransmissions, based on a field related to HARQ feedback application of SCI related to the each of the M HARQ-based retransmissions.

For example, HARQ feedback may be all enabled for each of the N blind retransmissions, based on a field related to HARQ feedback application of SCI related to the each of the N blind retransmissions.

For example, the N blind retransmissions may be performed before the M HARQ-based retransmissions.

For example, an HARQ feedback may be enabled for a last retransmission among the N blind retransmissions, based on a field related to HARQ feedback application of SCI related to the last retransmission among the N blind retransmissions.

For example, the M HARQ-based retransmissions may be performed before the N blind retransmissions.

For example, the N blind retransmissions may be performed before HARQ feedbacks related to each of the N blind retransmissions are received.

For example, an HARQ feedback related to the initial transmission may be not received.

For example, HARQ feedbacks related to the M HARQ-based retransmissions may be not performed, based on there being no resource related to a physical sidelink feedback channel (PSFCH) between adjacent resources on which the initial transmission or a retransmission of the MAC PDU is performed.

For example, a resource related to the N blind retransmissions may be selected from resources excluding a time interval between a time point related to the M HARQ-based retransmissions and a time point related to a PSFCH related to the PSSCH.

For example, the transmission number related to the PSSCH required in the PDB may be determined based on at least one of a service priority, congestion level, a resource pool related to the wireless communication, a cast type related to the wireless communication, a HARQ feedback scheme, or a sidelink (SL) operation mode.

For example, a ratio of the M to the N may be determined based on at least one of a service priority, congestion level, a resource pool related to the wireless communication, a cast type related to the wireless communication, a HARQ feedback scheme, or a sidelink (SL) operation mode.

The above-described embodiment can be applied to various devices to be described below. For example, a processor 102 of a first device 100 may control a transceiver 106 to transmit sidelink control information (SCI), to a second device 200, through a physical sidelink control channel (PSCCH). And, the processor 102 of the first device 100 may control the transceiver 106 to perform an initial transmission of a medium access control (MAC) protocol data unit (PDU), to the second device 200, through a physical sidelink shared channel (PSSCH) based on the SCI. And, the processor 102 of the first device 100 may control the transceiver 106 to perform N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB. For example, a number of the initial transmission, the N blind retransmissions and the M HARQ-based retransmissions may be the same as the transmission number related to the PSSCH required in the PDB, the MAC PDU may be generated based on a logical channel (LCH) in which an HARQ feedback is enabled, and the N or the M may be a zero or a positive integer.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: transmit sidelink control information (SCI), to a second device, through a physical sidelink control channel (PSCCH); perform an initial transmission of a medium access control (MAC) protocol data unit (PDU), to the second device, through a physical sidelink shared channel (PSSCH) based on the SCI; and perform N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB, wherein a number of the initial transmission, the N blind retransmissions and the M HARQ-based retransmissions may be the same as the transmission number related to the PSSCH required in the PDB, wherein the MAC PDU may be generated based on a logical channel (LCH) in which an HARQ feedback is enabled, and wherein the N or the M may be a zero or a positive integer.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: transmit sidelink control information (SCI), to a second UE, through a physical sidelink control channel (PSCCH); perform an initial transmission of a medium access control (MAC) protocol data unit (PDU), to the second UE, through a physical sidelink shared channel (PSSCH) based on the SCI; and perform N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB, wherein a number of the initial transmission, the N blind retransmissions and the M HARQ-based retransmissions may be the same as the transmission number related to the PSSCH required in the PDB, wherein the MAC PDU may be generated based on a logical channel (LCH) in which an HARQ feedback is enabled, and wherein the N or the M may be a zero or a positive integer.

According to an embodiment of the present disclosure, a non-transitory computer-readable storage medium storing instructions may be proposed. For example, the instructions, when executed, may cause a first device to: transmit sidelink control information (SCI), to a second device, through a physical sidelink control channel (PSCCH); perform an initial transmission of a medium access control (MAC) protocol data unit (PDU), to the second device, through a physical sidelink shared channel (PSSCH) based on the SCI; and perform N blind retransmissions and M hybrid automatic repeat request (HARQ)-based retransmissions for the MAC PDU in packet delay budget (PDB), based on a number of the initial transmission and HARQ-based retransmissions being less than a transmission number related to the PSSCH required in the PDB, wherein a number of the initial transmission, the N blind retransmissions and the M HARQ-based retransmissions may be the same as the transmission number related to the PSSCH required in the PDB, wherein the MAC PDU may be generated based on a logical channel (LCH) in which an HARQ feedback is enabled, and wherein the N or the M may be a zero or a positive integer.

Figure 14:
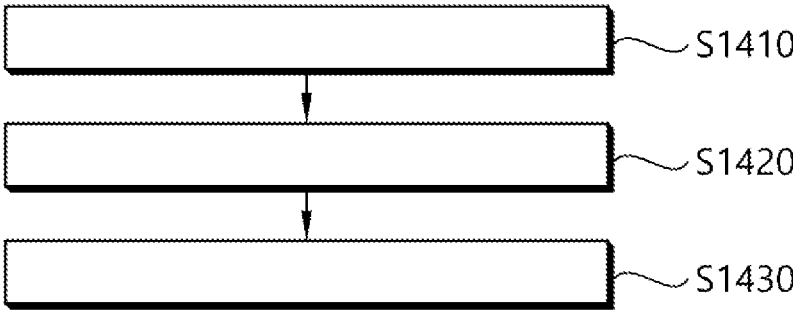
FIG. 14 shows a procedure in which a second device performs wireless communication, according to an embodiment of the present disclosure.

FIG. 14 shows a procedure in which a second device performs wireless communication, according to an embodiment of the present disclosure. The embodiment of FIG. 14 may be combined with various embodiments of the present disclosure.

Referring to FIG. 14, in step S1410, the second device may receive sidelink control information (SCI), from a first device, through a physical sidelink control channel (PSCCH). In step S1420, the second device may receive a medium access control (MAC) protocol data unit (PDU), from the first device, through a physical sidelink shared channel (PSSCH) based on the SCI. In step S1430, the second device may perform a hybrid automatic repeat request (HARQ) feedback for the PSSCH, based on a field related to HARQ feedback application of SCI related to the PSSCH. For example, the MAC PDU may be generated based on a logical channel (LCH) in which an HARQ feedback is enabled, and the MAD PDU may be received through a retransmission.

For example, the retransmission may be a blind retransmission, and an HARQ feedback for the blind retransmission may be enabled.

The above-described embodiment can be applied to various devices to be described below. For example, a processor 202 of a second device 200 may control a transceiver 206 to receive sidelink control information (SCI), from a first device 100, through a physical sidelink control channel (PSCCH). And, the processor 202 of the second device 200 may control the transceiver 206 to receive a medium access control (MAC) protocol data unit (PDU), from the first device 100, through a physical sidelink shared channel (PSSCH) based on the SCI. And, the processor 202 of the second device 200 may control the transceiver 206 to perform a hybrid automatic repeat request (HARQ) feedback for the PSSCH, based on a field related to HARQ feedback application of SCI related to the PSSCH. For example, the MAC PDU may be generated based on a logical channel (LCH) in which an HARQ feedback is enabled, and the MAD PDU may be received through a retransmission.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive sidelink control information (SCI), from a first device, through a physical sidelink control channel (PSCCH); receive a medium access control (MAC) protocol data unit (PDU), from the first device, through a physical sidelink shared channel (PSSCH) based on the SCI; and perform a hybrid automatic repeat request (HARQ) feedback for the PSSCH, based on a field related to HARQ feedback application of SCI related to the PSSCH, wherein the MAC PDU may be generated based on a logical channel (LCH) in which an HARQ feedback is enabled, and wherein the MAD PDU may be received through a retransmission.

For example, the retransmission may be a blind retransmission, and an HARQ feedback for the blind retransmission may be enabled.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
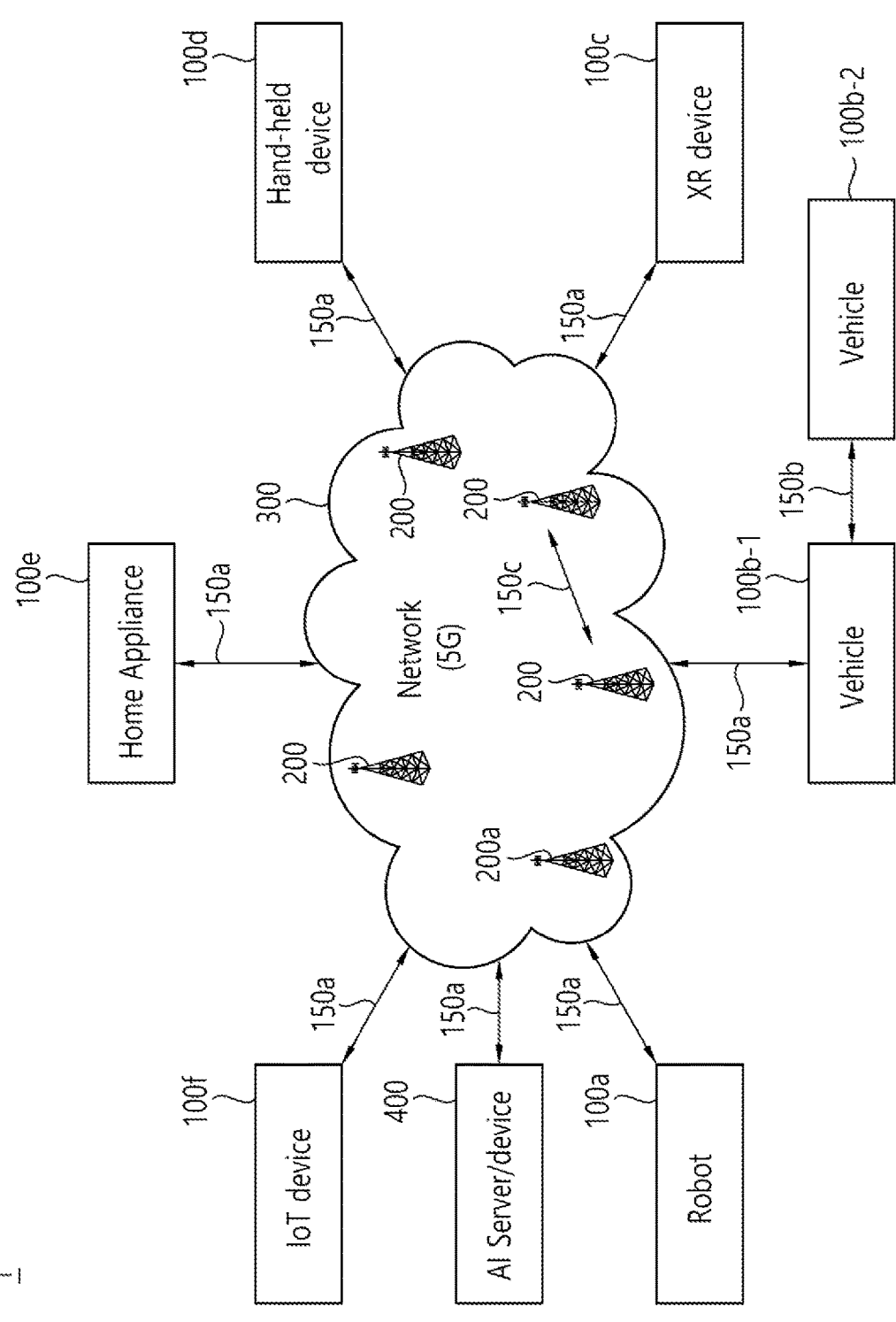
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
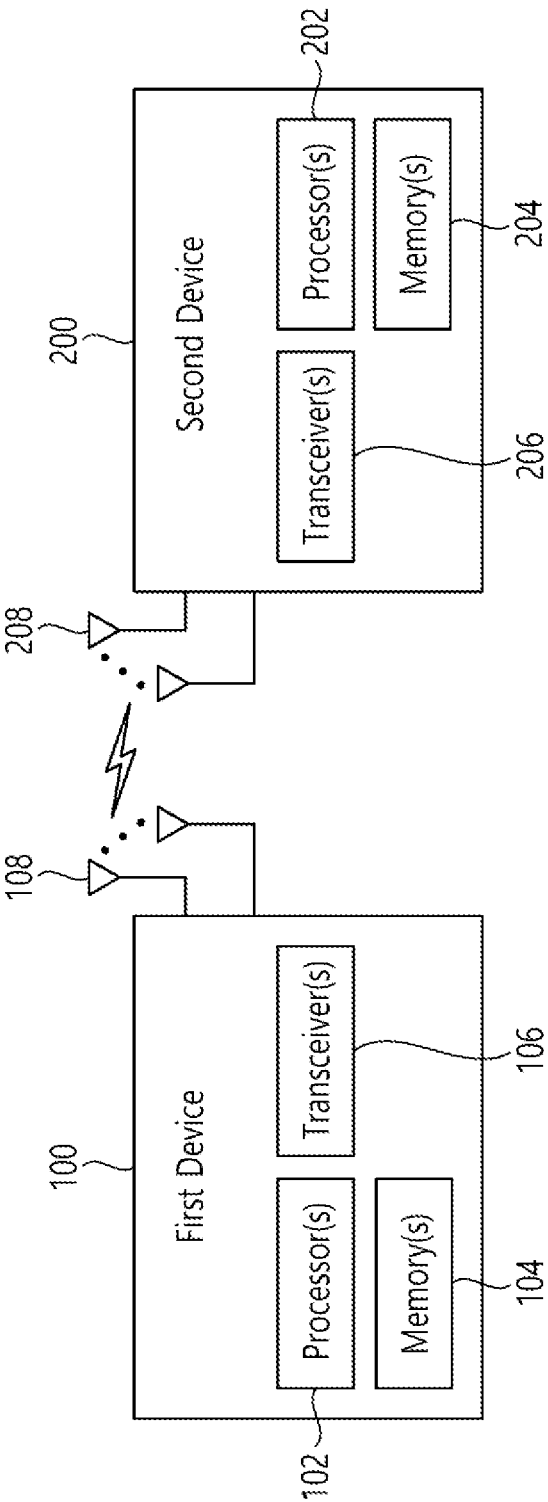
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
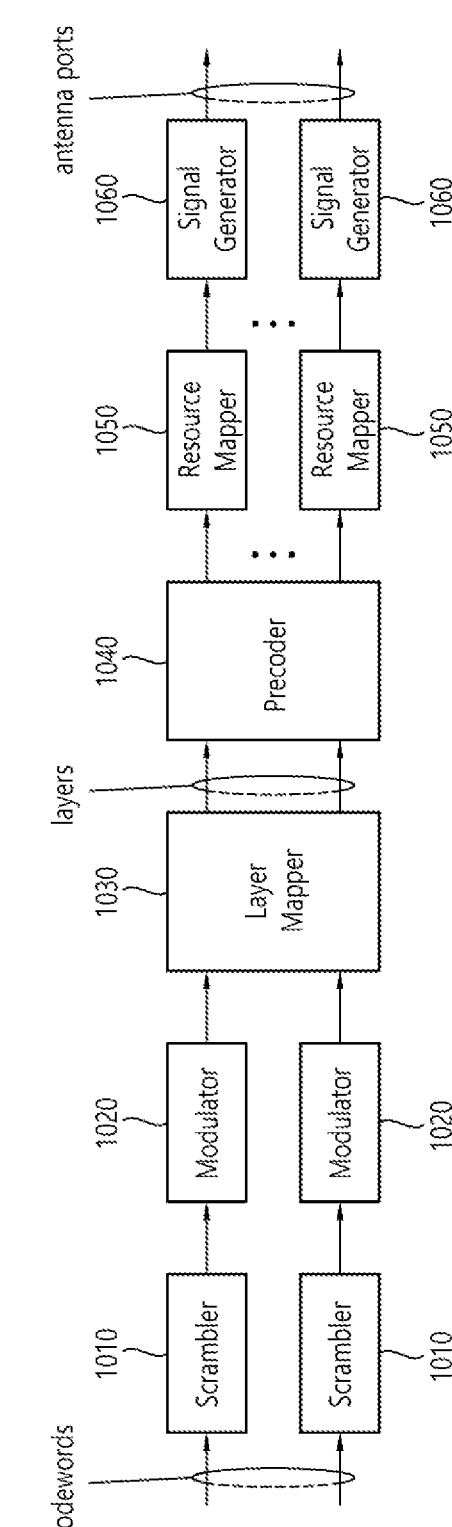
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
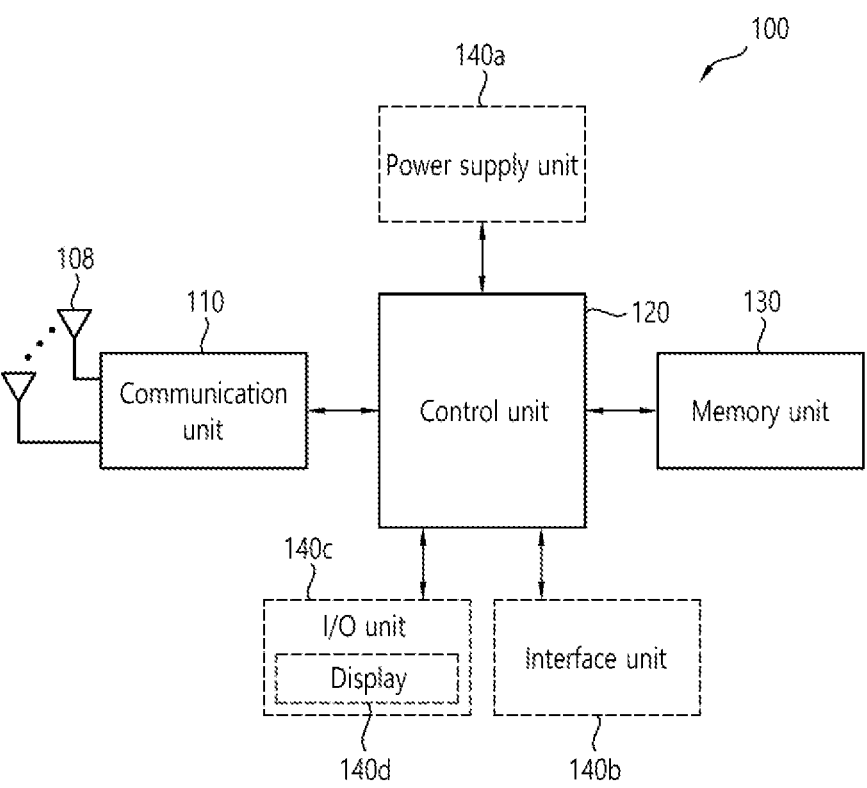
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:
transmitting, by a first device, to a second device, control information through a physical control channel;
performing, by the first device, based on the control information, an initial transmission of a medium access control protocol data unit, to the second device, through a physical shared channel; and
performing, by the first device, based on that a number of the initial transmission and hybrid automatic repeat request-based retransmissions is less than a transmission number related to the physical shared channel required in a packet delay budget, N blind retransmissions and M hybrid automatic repeat request-based retransmissions for the medium access control protocol data unit in the packet delay budget,
wherein a number of the initial transmission, the N blind retransmissions, and the M hybrid automatic repeat request-based retransmissions is the same as the transmission number related to the physical shared channel required in the packet delay budget,
wherein the medium access control protocol data unit is generated based on a logical channel in which hybrid automatic repeat request feedback is enabled,
wherein hybrid automatic repeat request feedback related to the M hybrid automatic repeat request-based retransmissions is not performed, based on that there is no resource related to a physical feedback channel between contiguous resources on which the initial transmission or a retransmission of the medium access control protocol data unit is performed,
wherein N is zero or a positive integer, and
wherein M is zero or a positive integer.

2. The method of claim 1, wherein the hybrid automatic repeat request feedback is enabled for each of the M hybrid automatic repeat request-based retransmissions, based on a field related to hybrid automatic repeat request feedback application of the control information related to each of the M hybrid automatic repeat request-based retransmissions.

3. The method of claim 1, wherein hybrid automatic repeat request feedback is all enabled for each of the N blind retransmissions, based on a field related to hybrid automatic repeat request feedback application of the control information related to each of the N blind retransmissions.

4. The method of claim 1, wherein the N blind retransmissions are performed before the M hybrid automatic repeat request-based retransmissions.

5. The method of claim 4, wherein hybrid automatic repeat request feedback is enabled for a last retransmission among the N blind retransmissions, based on a field related to hybrid automatic repeat request feedback application of the control information related to the last retransmission among the N blind retransmissions.

6. The method of claim 1, wherein the M hybrid automatic repeat request-based retransmissions are performed before the N blind retransmissions.

7. The method of claim 1, wherein the N blind retransmissions are performed before hybrid automatic repeat request feedback related to each of the N blind retransmissions is received.

8. The method of claim 1, wherein hybrid automatic repeat request feedback related to the initial transmission is not received.

9. The method of claim 1, wherein a resource related to the N blind retransmissions is selected from resources excluding a time interval between a time point related to the M hybrid automatic repeat request-based retransmissions and a time point related to a physical feedback channel related to the physical shared channel.

10. The method of claim 1, wherein the transmission number related to the physical shared channel required in the packet delay budget is determined based on at least one of a service priority, a congestion level, a resource pool related to wireless communication, a cast type related to the wireless communication, a hybrid automatic repeat request feedback scheme, or a sidelink operation mode.

11. The method of claim 1, wherein a ratio of the M to the Nis determined based on at least one of a service priority, congestion level, a resource pool related to wireless communication, a cast type related to the wireless communication, a hybrid automatic repeat request feedback scheme, or a sidelink operation mode.

12. A first device, comprising:
at least one transceiver;
at least one processor; and
at least one memory connected to the at least one processor and storing instructions that, based on being executed by the at least one processor, cause the first device to perform operations comprising:
transmitting, to a second device, control information through a physical control channel;
performing, based on the control information, an initial transmission of a medium access control protocol data unit, to the second device, through a physical shared channel; and
performing, based on that a number of the initial transmission and hybrid automatic repeat request-based retransmissions is less than a transmission number related to the physical shared channel required in a packet delay budget, N blind retransmissions and M hybrid automatic repeat request-based retransmissions for the medium access control protocol data unit in the packet delay budget,
wherein a number of the initial transmission, the N blind retransmissions, and the M hybrid automatic repeat request-based retransmissions is the same as the transmission number related to the physical shared channel required in the packet delay budget,
wherein the medium access control protocol data unit is generated based on a logical channel in which hybrid automatic repeat request feedback is enabled,
wherein hybrid automatic repeat request feedback related to the M hybrid automatic repeat request-based retransmissions is not performed, based on that there is no resource related to a physical feedback channel between contiguous resources on which the initial transmission or a retransmission of the medium access control protocol data unit is performed,
wherein N is zero or a positive integer, and
wherein M is zero or a positive integer.

13. A processing device comprising:

at least one processor; and at least one memory connected to the at least one processor and storing instructions that, based on being executed by the at least one processor, cause a first device to perform operations comprising:

transmitting, to a second device, control information through a physical control channel;

performing, based on the control information, an initial transmission of a medium access control protocol data unit, to the second device, through a physical shared channel; and performing, based on that a number of the initial transmission and hybrid automatic repeat request-based retransmissions is less than a transmission number related to the physical shared channel required in a packet delay budget, N blind retransmissions and M hybrid automatic repeat request-based retransmissions for the medium access control protocol data unit in the packet delay budget, wherein a number of the initial transmission, the N blind retransmissions, and the M hybrid automatic repeat request-based retransmissions is the same as the transmission number related to the physical shared channel required in the packet delay budget, wherein the medium access control protocol data unit is generated based on a logical channel in which hybrid automatic repeat request feedback is enabled, wherein hybrid automatic repeat request feedback related to the M hybrid automatic repeat request-based retransmissions is not performed, based on that there is no resource related to a physical feedback channel between contiguous resources on which the initial transmission or a retransmission of the medium access control protocol data unit is performed, wherein N is zero or a positive integer, and wherein M is zero or a positive integer.

14. The method of claim 1, wherein the control information is sidelink control information, wherein the physical control channel is a physical sidelink control channel, and wherein the physical shared channel is a physical sidelink shared channel.

15. The method of claim 1, wherein the physical feedback channel is a physical sidelink feedback channel.

16. The method of claim 1, wherein the method is performed by the first device.

* * * * *